United States Patent [19]

Han

[11] Patent Number: 5,203,050

[45] Date of Patent: Apr. 20, 1993

[54] WIPER DEVICE FOR A MOTOR VEHICLE REAR VIEW MIRROR

[76] Inventor: Ivan Han, No. 57-30, Ming Yi Road, Sec. 1, 34th Lin, Wu Ku Hsiang, Taipei, Taiwan

[21] Appl. No.: 775,910

[22] Filed: Oct. 15, 1991

[51] Int. Cl.⁵ .......................... B60S 1/20; B60S 1/46; B60S 1/56
[52] U.S. Cl. ......................... 15/250.003; 15/250.01; 15/250.24; 15/250.29; 15/250.12; 15/250.36; 15/250.30
[58] Field of Search ............ 15/280 R, 250 B, 250.24, 15/250.29, 250.30, 250.03, 250.04, 250.26, 250.12, 250.01, 250.36; 464/46

[56] References Cited

U.S. PATENT DOCUMENTS

| | | | |
|---|---|---|---|
| 2,648,087 | 8/1953 | Kiker, Jr. | 15/250.29 |
| 2,659,220 | 11/1953 | Cherry | 464/46 |
| 2,737,792 | 3/1956 | Dyer | 464/46 |
| 3,032,797 | 5/1962 | Presser | 15/250.24 |
| 3,295,004 | 12/1966 | Hirsch | 15/250.01 |
| 3,447,187 | 6/1969 | Barrett | 15/250 B |
| 4,870,713 | 10/1989 | Raynor | 15/250 B |

FOREIGN PATENT DOCUMENTS

| | | | |
|---|---|---|---|
| 3600198 | 7/1987 | Fed. Rep. of Germany | 15/250.24 |
| 3700678 | 7/1987 | Fed. Rep. of Germany | 15/250.29 |
| 2617781 | 1/1989 | France | 15/250 B |
| 0008953 | 1/1980 | Japan | 15/250 B |
| 0036138 | 3/1980 | Japan | 15/250.24 |
| 0021934 | 2/1981 | Japan | 15/250 B |

Primary Examiner—Harvey C. Hornsby
Assistant Examiner—Gary K. Graham
Attorney, Agent, or Firm—Morton J. Rosenberg; David I. Klein

[57] ABSTRACT

A wiper device for cleaning a motor vehicle rear view mirror is provided. The wiper device includes a water sprayer unit (40) connected to a motor vehicle's rear view mirror. A wiper (32) fastened between two slides (31,31') is driven by a motor (11) by means of a pull wire extending to an intermediate pair of pulley wheels in a cross-over manner to remove water and dust from the rear view mirror. A control circuit (60) is provided to drive the motor (11), allowing for a voltage polarity reversal to change its rotary direction.

6 Claims, 8 Drawing Sheets

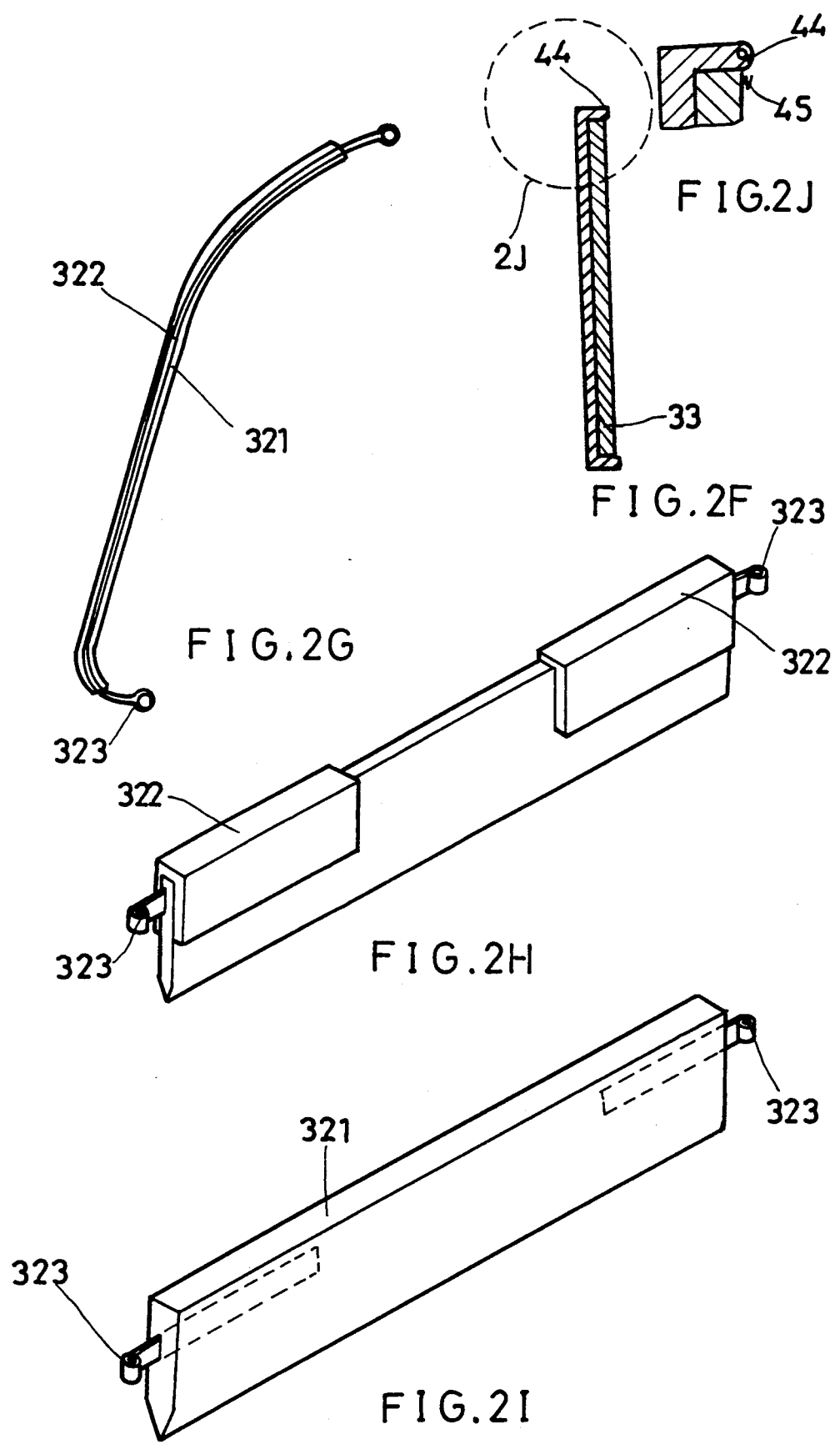

WIPER DEVICE FOR A MOTOR VEHICLE REAR VIEW MIRROR

BACKGROUND OF THE INVENTION

1. Field of the Invention

The present invention relates to a wiper device and relates more particularly to a wiper device for removing water and dust from a motor vehicle rear view mirror.

2. Prior Art

In motor vehicles, a windshield wiper is generally provided for removing water and dust from the windshield glass during the rain, so that a motor vehicle's driver can see through the windshield clearly. Since the rear view mirrors of a motor vehicle may also be contaminated by dust or blocked by rain water, they must be protected against rain water and washed regularly so as to clearly reflect the images of objects. Several rainhood structures for protecting a motor vehicle rear view mirror against the rain have been known, examples of which have been disclosed in U.S. Pat. Nos. 4,834,157; 4,620,777; 4,668,085; and 4,750,824. However, a rainhood can only protect a motor vehicle rear view mirror against the rain. If the glass of a motor vehicle rear view mirror is contaminated by dust, it must be washed and cleaned. The present invention has been developed to provide a wiper device which can be automatically controlled to remove dust and water from a motor vehicle rear view mirror.

SUMMARY OF THE INVENTION

The present invention provides a wiper device for cleaning a motor vehicle's rear view mirror. The device comprises a frame mounted on the body of a motor vehicle to hold a rear view mirror, with two slides driven by an electric winch through a crossed belt, to alternatively slide back and forth on this frame. A wiper is fastened to the two slides, and is carried thereby to rub against the glass surface of the rear view mirror. A water sprayer connected to a motor vehicle's windshield washer is provided to spray water over the glass surface of the rear view mirror for cleaning.

The present invention will now be described by way of examples only, with reference to the annexed drawings.

BRIEF DESCRIPTION OF THE DRAWINGS

FIG. 2F is a cross-sectional view of the rear view mirror of FIG. 2 taken at the section line 2F—2F;

FIG. 2G illustrates a first type of wiper blade as constructed according to the present invention;

FIG. 2H illustrates a second type of wiper blade as constructed according to the present invention;

FIG. 2I illustrates a third type of wiper blade as constructed according to the present invention;

FIG. 2J is an enlarged portion of the cross-sectional view of FIG. 2F showing the spray nozzle;

DESCRIPTION OF THE PREFERRED EMBODIMENTS

Figure 1:
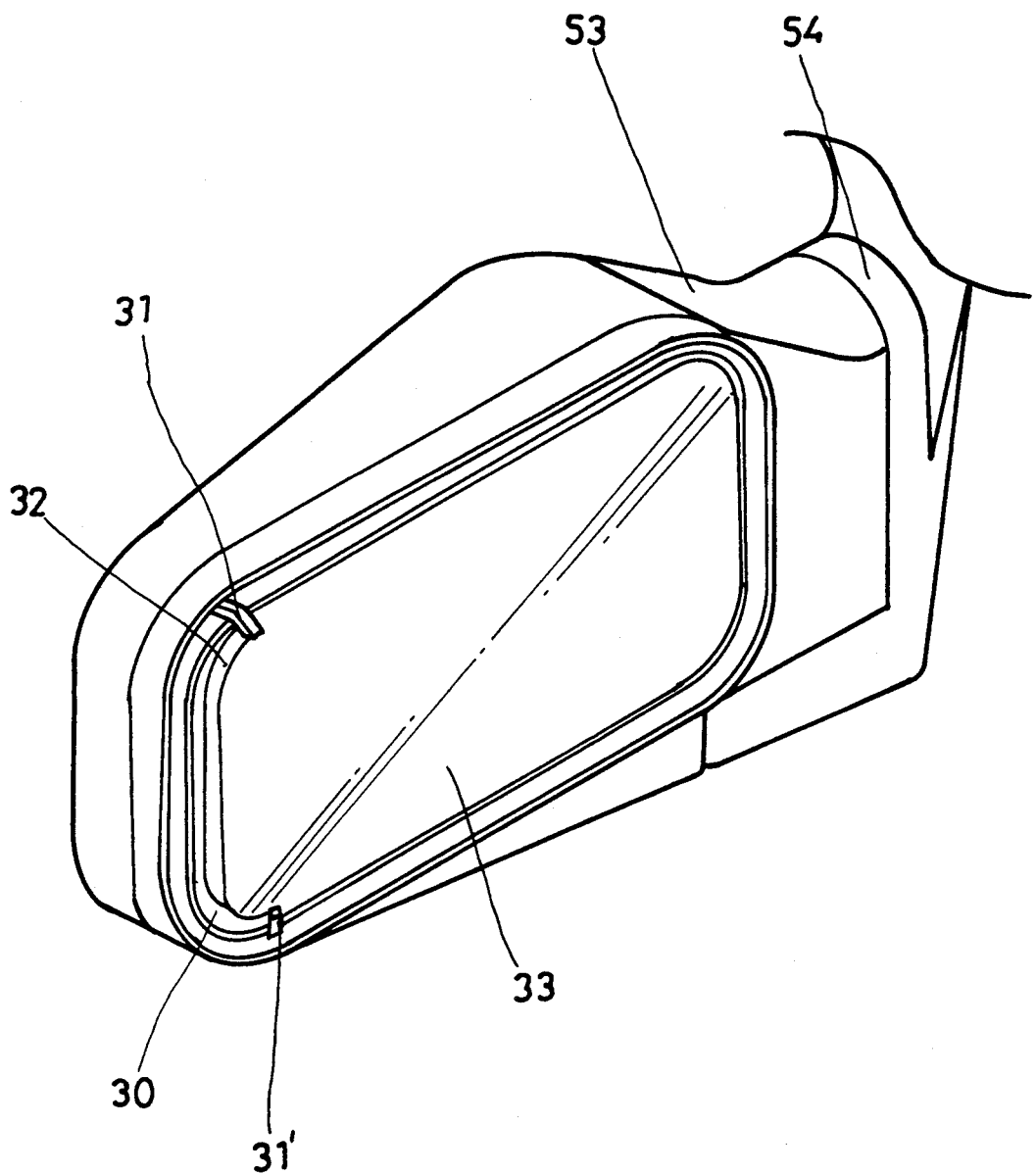
FIG. 1 is a perspective view of a wiper device embodying the present invention.

Turning now to the drawings, there is illustrated a wiper device as constructed in accordance with the present invention, which is generally comprised of a driving unit 10, a pull wire unit 20, a wiper unit 30, a water sprayer unit 40, a frame unit 50, and a control circuit unit 60.

Referring to FIGS. 1, 2, 3 and 3A, the driving unit 10 comprises a motor 11, a worm 12 coupled to motor 11, a worm gear 13 drivingly engaged with worm 12. A gear 14 is drivingly engaged with worm gear 13 to rotate a lining 15, and thereby drive a pulley 16, secured by a pivot 17. The lining 15 is disposed between the gear 14 and the pulley 16 and retained in position by the spring clamp 19. Because of the effect of the spring clamp 19, the pulley 16 is caused to rotate through its frictional contact with the lining 15, when the gear 14 is driven to rotate by the motor 11 via the worm 12 and the worm gear 13. When the pulley 16 is stopped, such as when the wiper blade is blocked, the inertia force from the motor 11, until it is shut-off, will be transmitted to the lining 15, whose contact with pulley 16 will slip and therefore protect the gear 14 from damage.

Figure 3:
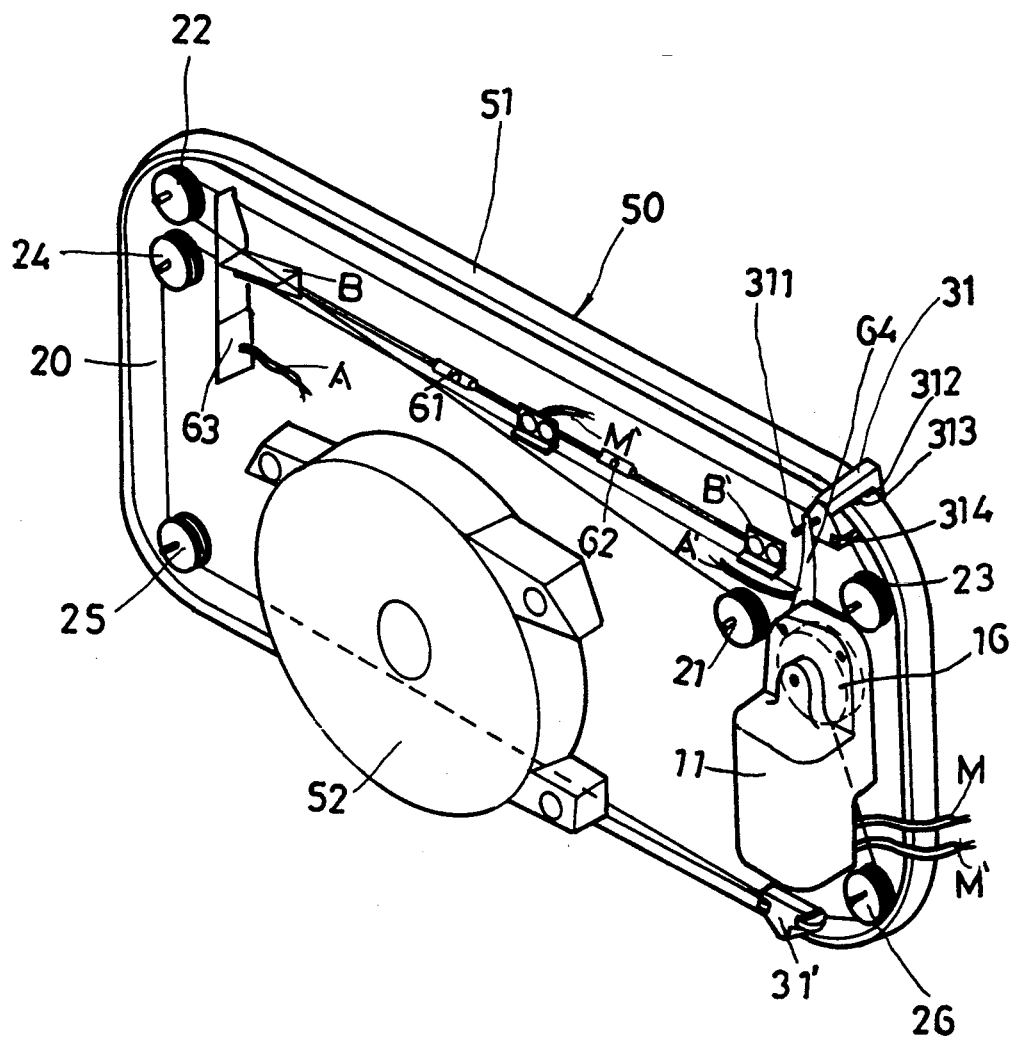
FIG. 3 is a rear perspective view of the wiper device of the present invention.
Figure 3A:
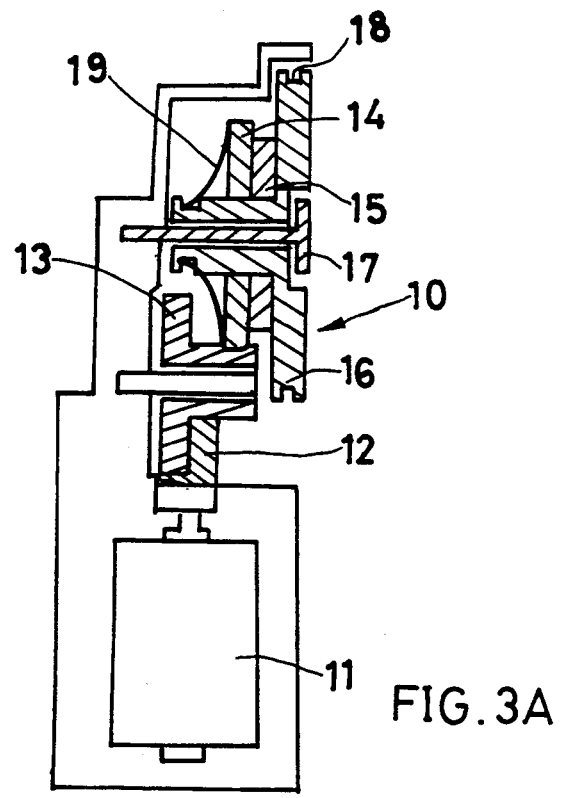
FIG. 3A is a partial cross-sectional view showing the transmission of driving power from the motor to the output pulley.

Referring to FIGS. 1, 3 and 3A, the pull wire unit 20 is comprised of a wire extending from a fixing hole on the pulley 16 and wound around an annular groove 18 formed thereon. The wire is then delivered through a first wheel 21, a second wheel 22, a third wheel 23, a fourth wheel 24 where it crosses the portion of the pull wire extending between wheels 21 and 22, a fifth wheel 25 and a sixth wheel 26, and then returned back to the pulley 16. A first slide 31 is coupled to the pull wire unit 20 at the top of the frame 51, between wheels 22 and 23, and a second slide 31' is coupled to the pull wire unit 20 at the bottom of the frame 51 between wheels 25 and 26, and disposed in parallel with the first slide 31. When the pulley 16 is rotated, both of slides 31 and 31' will be simultaneously carried by pull wire unit 20 to move in horizontal direction responsive to rotation of pulley 16. Both slides being displaced in the same direction.

Referring to FIGS. 2 and 2A through 2E, there is shown, casings of motor vehicle rear view mirrors which may be variously shaped. FIGS. 2A through 2E show five different casings for a motor vehicle rear view mirror. The mirror for a motor vehicle rear view mirror may be made from a flat sheet of glass or from a sheet of glass which curves outward in X-axis direction, Y-axis direction or Z-axis direction. A wiper unit 30 in accordance with the present invention may be alternatively made to fit different casings and different glass contours. There are three different types of wiper units 30 for use with particular mirrors. A first type of wiper unit 30 is provided to operate with the casings shown in FIGS. 2A and 2B. In this alternative, a wiper 32 is fastened between the first and second slides 31, 31' by lock pins 314 (shown in FIG. 3). Wiper 32 is comprised of a rubber blade 321 covered over a holder 322 which is made from titanium alloy or plastic material (as shown in FIG. 2G). The wiper 32 is made in a substantially U-shaped configuration. When the first and second slides 31, 31' are moved to slide horizontally, the wiper 32 is longitudinally stretched, since the casing sides upon which slides are coupled are inclined one with respect to the other, causing the rubber blade 321 to rub against the glass 33 of the motor vehicle rear view mirror to which the present invention is mounted.

A second type of wiper unit 30, as shown in FIG. 2H, will not be caused to deform when it is moved in a horizontal direction. This type of wiper unit 30 is suitable for the casings shown in FIGS. 2C and 2D and suitable for removing water and moisture from a mirror having a convex lens. In this type of wiper unit 30, the holder 322 is comprised of two metal clamps clamped on the rubber blade 321 at the top edge thereof at two opposite ends. A third type of wiper unit 30, as shown in FIG. 2I, is stretchable and suitable for the casing as shown in FIG. 2E.

Figure 4:
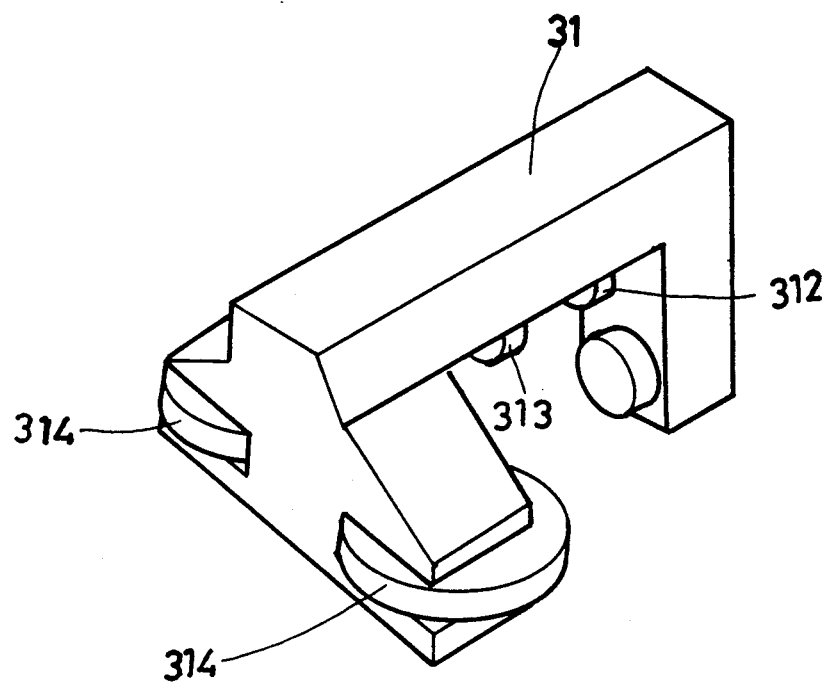
FIG. 4 is a perspective view showing the structure of the slide.

Referring to FIGS. 3, 3A and 4, the first and second slides 31, 31' are symmetrical in structure, each of which is comprised of a plurality of rollers 312 and 313 and arranged to slide on the frame 51 of the frame unit 50. The first slide 31 further comprises a trigger rod 311 at one side which may be alternately moved to contact the switches 63, 64, the switches being located at the two opposite ends of the displacement path for the slides. The opening of either switch thereby only permitting the motor 11 to operate in the reverse rotary direction from its previous direction, when the source potential is reversed externally. As indicated, the two opposite ends of the wiper 32 of the wiper unit 30 are secured to the first and second slides 31, 31' by lock pins 314. The slides 31, 31' are strong enough to absorb the torsional force from the wiper 32 when the wiper is stretched for removing water and dust from a motor vehicle rear view mirror.

Figure 2:
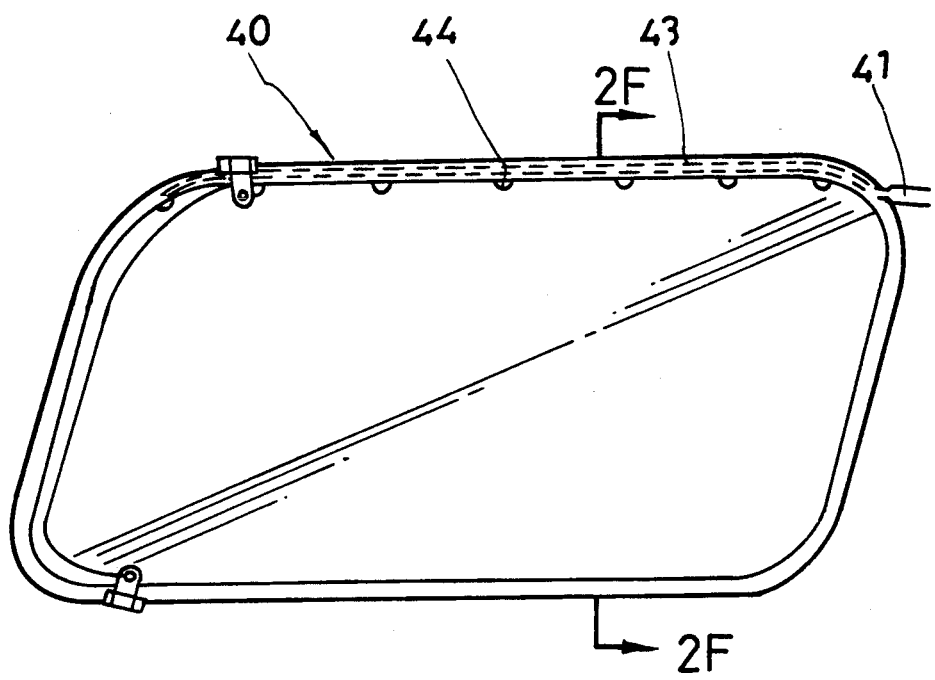
FIG. 2 is a front structural view thereof.
Figure 2A:
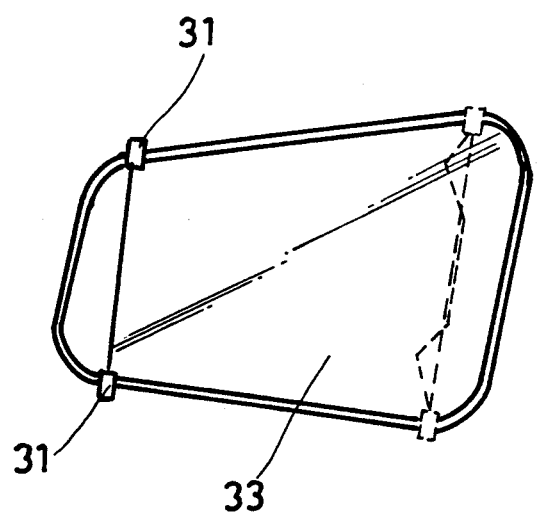
FIG. 2A is a schematic plan view of a first type of rear view mirror.
Figure 2B:
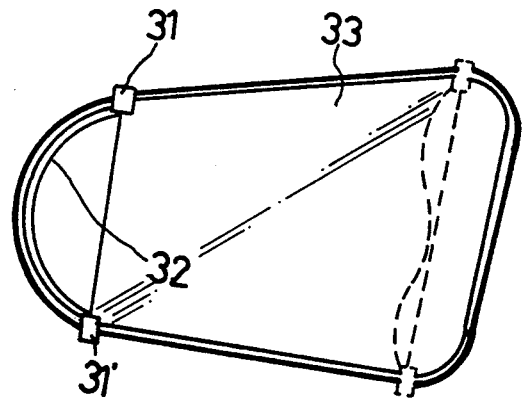
FIG. 2B is a schematic plan view of a second type of rear view mirror.
Figure 2C:
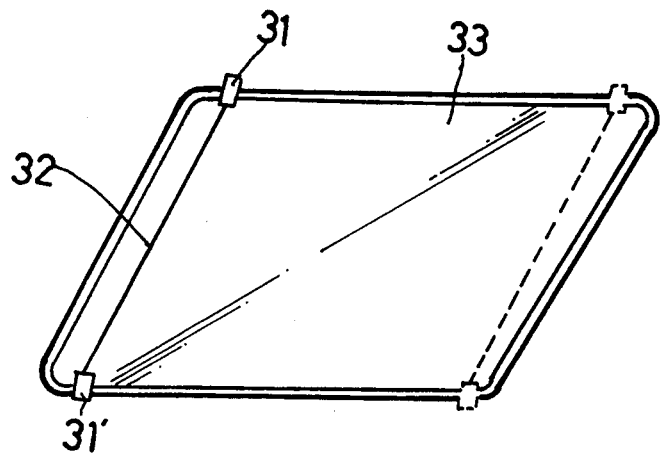
FIG. 2C is a schematic plan view of a third type of rear view mirror.
Figure 2D:
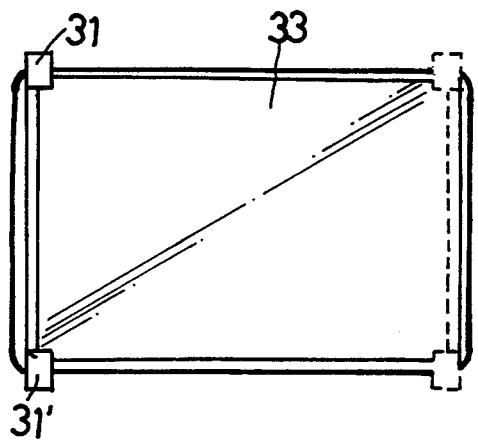
FIG. 2D is a schematic plan view of a fourth type of rear view mirror.
Figure 2E:
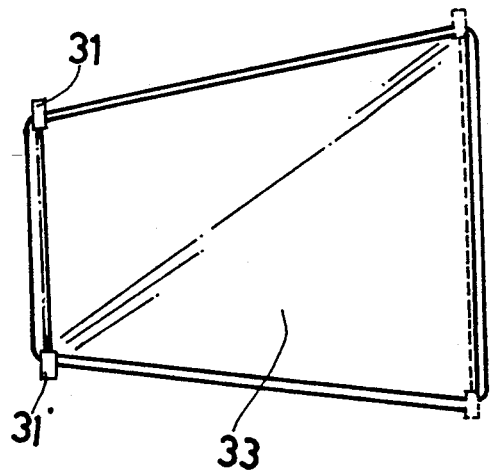
FIG. 2E is a schematic plan view of a fifth type of rear view mirror.

Referring to FIGS. 2, 2F and 2J, the water spray unit 40 is comprised of a connecting pipe 41 connected to a motor vehicle's windshield washer, and a spray pipe 43 connected to the connecting pipe 41 through a connector 42. The spray pipe 43 is fastened in the casing of a motor vehicle rear view mirror around the periphery of the glass 33 thereof, having a plurality of spray nozzles 44 formed therein at equal intervals. Through the spray nozzles 44, water 45 from the windshield washer can be sprayed over the glass 33 so that the wiper 32 can be moved to efficiently clean the glass 33.

Figure 5:
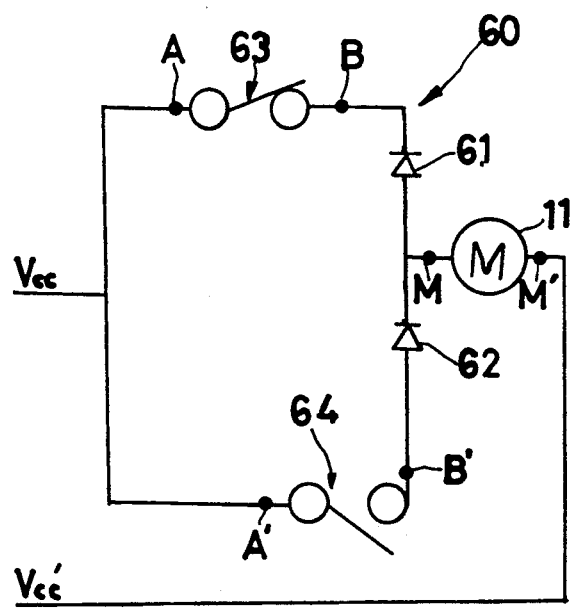
FIG. 5 is a circuit diagram of the control circuit unit.

Referring to FIGS. 3 and 5, the control circuit 60 is shown comprising two diodes 61, 62, and two switches 63, 64. The switches 63 and 64 can be a leaf spring type switch or micro-switch. When the motor 11 is turned on, the slides 31, 31' will be moved horizontally, rightwards or leftwards. As soon as the respective switch 63 or 64 is contacted by the trigger rod 311, the motor 11 is cut off from the power supply. As the motor 11 is stopped, the inertia force from the motor 11 will be absorbed by the lining 15 so that the gear 14 and the pulley 16 will not be damaged. When the motor 11 is stopped, i.e. the switch 63 is opened (switch 64 being closed), and $V_{CC}$ is a positive polarity potential, current can pass through diode 62, through the motor 11 to the negative connection $V_{CC}'$, and therefore, the motor 11 is caused to rotate in a direction opposite to its previous direction. When the motor 11 is caused to rotate in this opposite direction, the slides 31, 31' are moved horizontally leftwards or rightwards, depending upon the previous direction. As soon as the switch 64 is contacted by the trigger rod 311, the motor 11 will be stopped, such that a reverse polarity applied to the input ($V_{CC}'$ being of positive polarity) permits current to flow through motor 11, diode 61 and closed switch 63 to the negative side of the power supply, now connected to $V_{CC}$ through an external switch circuit (not shown). Therefore, the slides 31, 31' will be carried to alternatively move back and forth as required.

Referring to FIGS. 1, 2, 3 and 4, the frame unit 50 is comprises of a frame 51 covered with a covering 53 and attached to a mount 54 which can be conveniently fastened in a motor vehicle's side window, and includes a rotary device 52 for controlling the angular position of the glass 33. The rotary device 52 which controls the angular position of the glass 33 of a motor vehicle's rear view mirror is well known in the art and not within the scope of the present invention.

Figure 6:
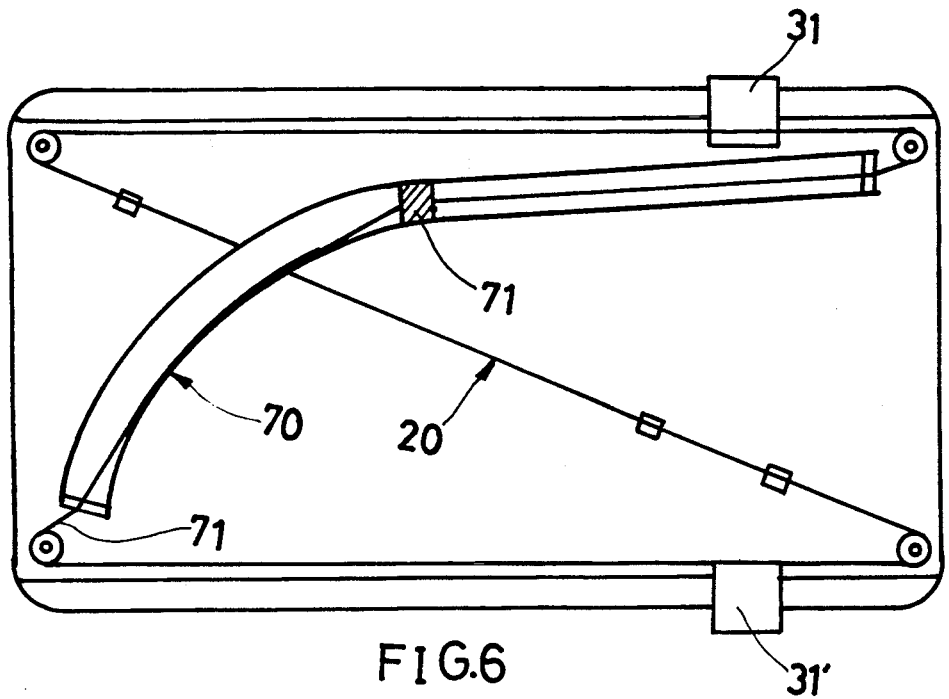
FIG. 6 illustrates an alternate form of the present invention in which a pneumatic cylinder is used to drive the pull wire unit.

Referring to FIG. 6, there is illustrated an alternate form of the present invention which is suitable for use in a truck or bus having an air compressor. In this embodiment, a pneumatic cylinder 70 is used to replace the motor 11 which is used in the aforesaid first embodiment of the wiper device. When the piston 71 of the pneumatic cylinder 70 is caused to move back and forth, the pull wire 72 which is secured thereto is moved accordingly, and therefore, the slides 31, 31' are carried to slide. This structure eliminates the arrangement of the switches and the diodes which are used in the first embodiment of the present invention.

What is claimed is:

1. A wiper device for cleaning a motor vehicle rear view mirror, comprising:

frame means coupled to a motor vehicle mirror for angular displacement therewith, said frame means having a top and bottom edge and a left and right side;

a wiper blade slidingly coupled to said frame means for longitudinal displacement across a surface of said mirror;

driving means fixedly coupled to said frame means for displacement of said wiper blade, said driving means including (1) a motor having a worm fixedly coupled to an output shaft thereof, (2) a worm gear meshingly engaged with said worm, (3) an output gear meshingly engaged with said worm gear, (4) an output pulley rotatably coupled to said output gear, and (5) means for resiliently engaging said output gear to said output pulley, said resilient engaging means including a liner member having opposing sides in contact with a respective surface of said output gear and said output pulley, said resilient engaging means further including a spring clamp member coupled between said output gear and said output pulley for applying a bias force to said liner member;

means for displacing said wiper blade coupled to said output pulley, said displacing means including (1) a pull wire having opposing ends coupled to said output pulley, (2) a first pair of first pulley wheels disposed on opposing sides of said frame means adjacent the top edge thereof for displaceably supporting a first portion of said pull wire, (3) a second pair of first pulley wheels disposed on opposing sides of said frame means adjacent the bottom edge thereof for displaceably supporting a second portion of said pull wire, and (4) a pair of second pulley wheels disposed between opposing sides of said frame means and between said first and second pairs of first pulley wheels, said pulley mounted pull wire extending in a cross-over manner between said pair of second pulley wheels, whereby said first and second portions of said pull wire are displaceable in the same direction responsive to a rotational displacement of said output pulley;

a first slide member slidingly coupled to said top edge of said frame means, said first slide member being fixedly coupled to said first portion of said pull wire for displacement therewith;

a second slide member slidingly coupled to said bottom edge of said frame means, said second slide member being fixedly coupled to said second portion of said pull wire for displacement therewith, each of said first and second slide members being coupled to a respective opposing end of said wiper blade for said longitudinal displacement thereof; and, a pair of switches disposed on opposing sides of said frame means for interrupting an electrical current path through said motor in a first direction without interrupting a current path through said motor in a second direction responsive to a predetermined displacement of said first slide member, wherein a rotational direction of said motor can be reversed by passing an electrical current in said second direction therethrough.

2. The wiper device as recited in claim 1 further comprising means for spraying water over said surface of said mirror coupled to said frame means, said spraying means being in fluid communication with a motor vehicle windshield washing unit.

3. The wiper device as recited in claim 2 where said spraying means includes a spray pipe member disposed around the periphery of said frame means, said spray pipe having a plurality of spray nozzles disposed in spaced relation along at least a portion thereof for spraying water over said surface of said mirror.

4. The wiper device as recited in claim 1 where said wiper blade is formed by a metallic core covered by a resilient material composition.

5. The wiper device as recited in claim 1 where said wiper blade is formed by a core of plastic material covered by a resilient material composition.

6. The wiper device as recited in claim 1 where each coupling between the wiper blade and slide members consists of a lock pin member.

* * * * *